Oct. 2, 1956      E. N. MEAKIN      2,764,952
KIBBLING APPARATUS
Filed Sept. 7, 1948      3 Sheets-Sheet 1
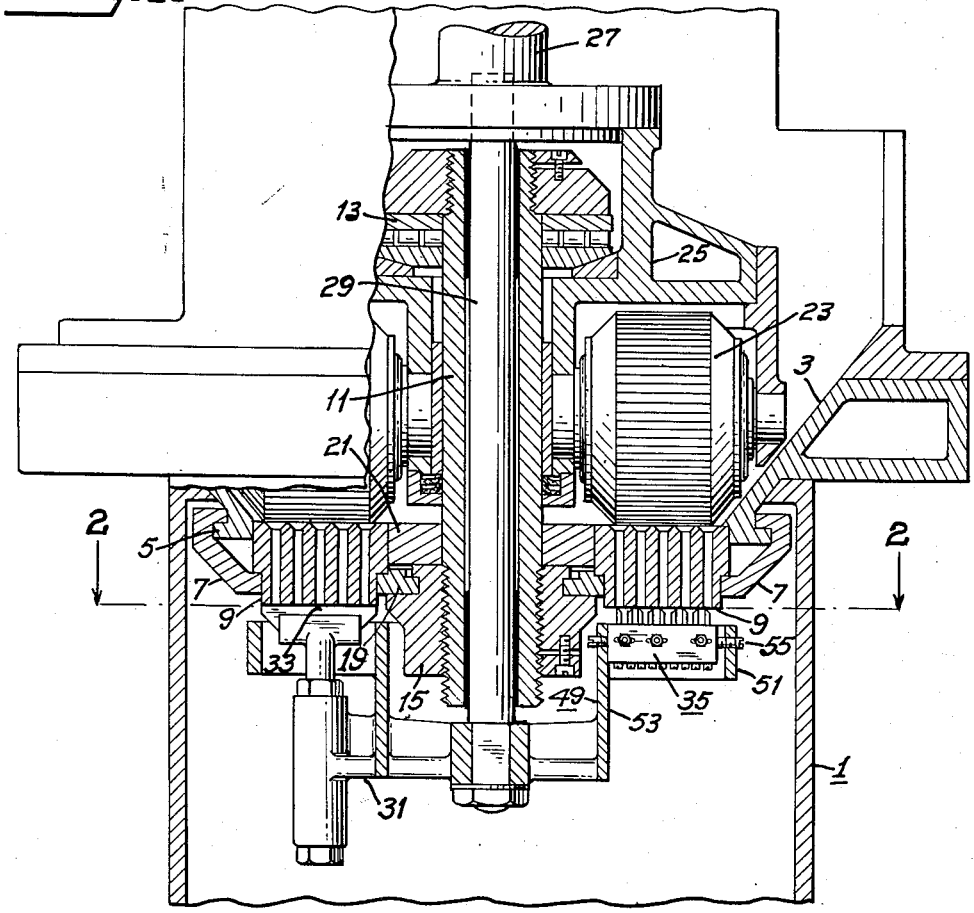
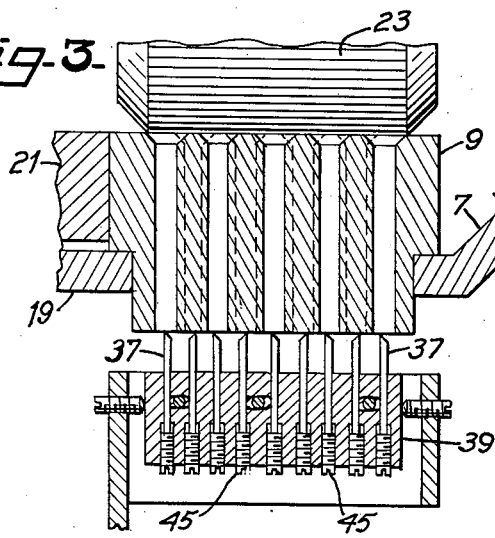
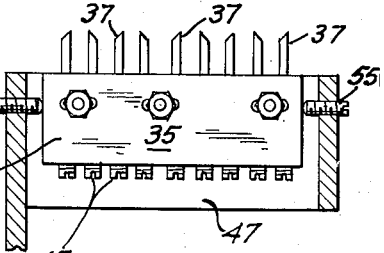
INVENTOR.
EDGAR N. MEAKIN
BY
Bruce & Brosler
HIS ATTORNEYS Oct. 2, 1956  E. N. MEAKIN  2,764,952
KIBBLING APPARATUS
Filed Sept. 7, 1948  3 Sheets-Sheet 2

INVENTOR.
EDGAR N. MEAKIN
BY Bruce & Brosler
HIS ATTORNEYS

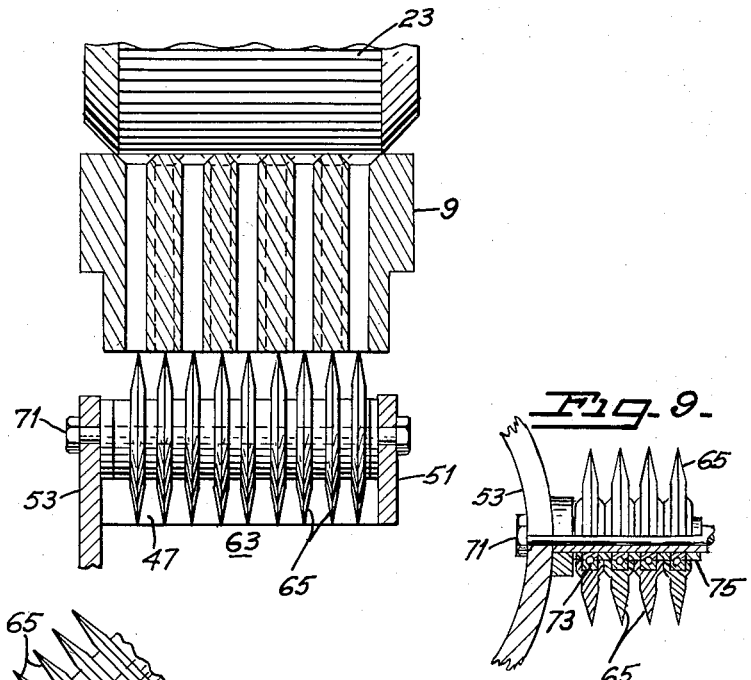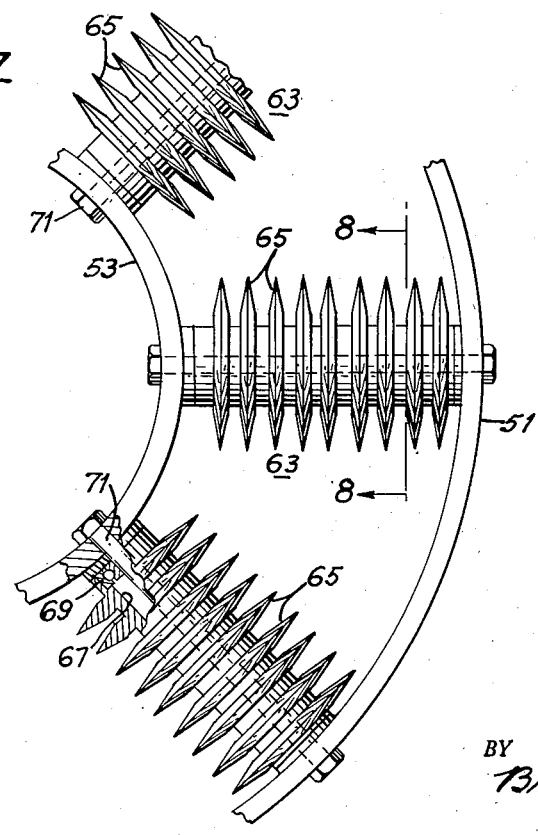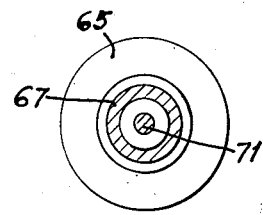

United States Patent Office 2,764,952
Patented Oct. 2, 1956

2,764,952

KIBBLING APPARATUS

Edgar N. Meakin, Hillsborough, Calif.

Application September 7, 1948, Serial No. 48,145

8 Claims. (Cl. 107—14)

My invention relates to the manufacture of a consolidated food, mineral, or other product, from finely comminuted ingredients, and more particularly to apparatus for producing such a product in small fragments or units of a size adapted, for example, for consumption by birds, baby chicks, and the like.

It has been common practice to produce small size pellets from meals and mashes for bird and chick feed by means of extrusion machines wherein the finely ground material is extruded under consolidating pressures through extrusion holes in a die and cut by knives into suitable lengths to form pellets. The cost of manufacture of dies for the production of small diameter extrusions is not only high, but the efficiency of an extrusion machine utilizing such small hole dies is much lower than when the same machine utilizes dies having holes of substantial diameter, of the order of ¾ of an inch for example. However, pellets of substantial diameter such as would be produced in machines utilizing such dies, would not in themselves be suitable for feed for small animals, such as birds, baby chicks and the like.

Nevertheless, the present invention contemplates the use of a pellet mill embodying a die with holes of substantial diameter in the production of feed for birds, baby chicks and the like, in order to obtain the advantage of the higher efficiency from a mill utilizing such a die. This we propose to accomplish by fracturing such larger diameter extrusions to the desired degree of fineness during the formation thereof.

Among the objects of my invention are:

(1) To provide a novel and improved apparatus for the production of a consolidated product to a desired degree of fineness;

(2) To provide a novel and improved apparatus for economically producing a consolidated product in small fragments;

(3) To provide a novel and improved apparatus for the production of a consolidated product in small sizes, which method and apparatus are highly efficient.

Additional objects of my invention will be brought out in the following description of my invention taken in conjunction with the accompanying drawings wherein:

Figure 1 is a fragmentary vertical view substantially in the plane 1—1 of Figure 2, of a pellet mill, incorporating a preferred form of the apparatus of my invention, and capable of carrying out the method of the present invention;

Figure 3 is a fragmentary vertical sectional view through the die and associated structure involved in the present invention;

Figure 4 is a fragmentary vertical elevational view, partly in section, of a kibbling knife and its supporting and adjusting structure, constituting an important feature of the present invention;

Figure 6 is a fragmentary vertical view in section, through a die, with a modified form of kibbling knife involved in the present invention;

Figure 7 is a fragmentary plan view of the kibbling knife and support of Figure 6;

Figure 8 is a vertical view in section through the kibbling knife of Figure 7, taken in the plane 8—8 of Figure 7;

Figure 9 is a fragmentary view, partly in section, of a kibbling knife representing a modification of that of Figure 7.

Figure 2:
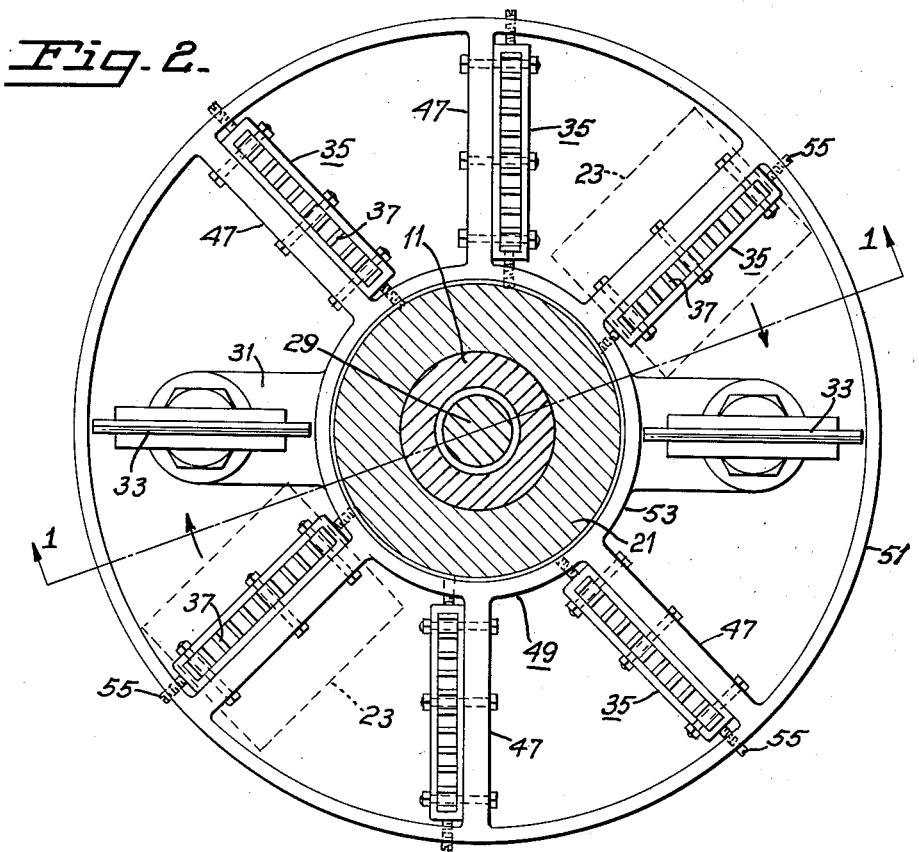
Figure 2 is a horizontal view through the mill of Figure 1 taken in the plane 2—2 of such figure.

Broadly stated, my invention contemplates the consolidation of finely comminuted materials into compact form and fracturing the compacted material into fragments or units of relatively small size, and more particularly, fracturing such compacted material as it emerges from the discharge side of an extrusion die.

Referring to the drawings for the details of apparatus for the carrying out of my invention, the mill in general, may comprise a base frame 1 supporting an inwardly sloping circular bowl 3 having an out-turned lower edge 5 from which a die clamp 7 is suspended to engage and support the outer edge of a ring die 9.

A centrally mounted sleeve 11, supported in any conventional manner in the upper portion of the mill, as by a thrust bearing 13, carries at its lower end, as by a nut 15 with a peripheral recess formed therein, the segments of a split ring 19 which offers support to the inner edge of the ring die 9.

A die block 21 carried on the nut flush with the compression surface of the die, forms with the die, the floor of a compression chamber into which the loose pellet material is fed for extrusion through the die.

Such extrusion of the pellet material is accomplished through the use of a pair of compression rollers 23 journalled in a spider adapted for rotation about the sleeve 11 as an axis. The rollers and spider are enclosed by a spider housing 25 which supports centrally thereof, the aforementioned thrust bearing 13, and connects with the main drive shaft 27 of the mill which extends upwardly along the longitudinal axis of the mill to suitable power drive means.

The upper structure of the mill, which for simplicity's sake has not been illustrated, may be of any desired construction, but preferably as illustrated in the patent to Edgar T. Meakin No. 2,065,141 of December 22, 1936, or the patent to Edgar N. Meakin No. 2,075,450, of March 30, 1937. Such structure, however, is incidental to the present invention.

Extending from the end of the main drive shaft downward axially of the sleeve 11 and spaced therefrom by suitable seals, is a knife shaft 29 which carries at its lower end, a bracket 31 for supporting a pair of diametrically disposed scraper knives 33 against the lower or discharge surface of the die ring. This type of knife is conventional structure in pellet mills, and functions in a conventional mill to produce pellets from the extruded strings of pellet material, as the knives are moved along the discharge surface of the die simultaneously with movement of the rollers, both being controlled by rotation of the main drive shaft in the type of machine depicted in Figure 1.

The present invention contemplates the use in conjunction with such scraper knives, of a plurality of kibbling knives 35, each such kibbling knife having one or more kibbling blades 37 mounted in a steel block 39. The steel block is provided longitudinally, with a plurality of vertical sockets spaced in accordance with the radial spacing of the die holes, each such socket being adapted to receive a knife blade and terminating at its lower end in a countersink which is threaded to receive an adjusting screw 45, whereby the elevation of each blade may be adjusted individually and independently of the others.

The kibbling knives 35 are mounted on the spokes 47 of a horizontally disposed wheel support 49 having a rim 51 and a hub 53. Such wheel support is welded or otherwise affixed to the knife bracket 31 for rotation therewith. The steel blocks which carry the blades are bolted to the spokes of the wheel support, the bolt holes through the steel block being elongated to permit radial adjustment of the kibbling knives to bring the blades into line with the die holes. The adjusted positions of the kibbling knives are then secured by suitable set screws 55 radially disposed through the rim and hub, into engagement with the ends of the steel blocks.

It will be apparent that as the kibbling knives rotate along the discharge side of the die ring, that the pellet material being extruded through the die holes, will, upon being engaged by the blades of a kibbling knife, be fractured into small fragments to produce a kibbled product.

In locating the kibbling knives with respect to the rollers, where the knives and rollers travel around the die at the same angular velocity as in the mill of Figure 1, the first of a group of kibbling knives is preferably disposed just slightly ahead of the lowermost portion of a roller, and when so related to the roller above, this particular kibbling knife will be in position to engage the initial extrusion of material through any die hole which may be attributable to this roller. This is possible by reason of the fact that a roller extrudes in advance of itself, due to the piling up of material in front of the roller as it proceeds in its movement about the face of the die. With respect to any of the die holes, completion of extrusion with each pass of the roller thereover, occurs subsequent to the passage of the first of a group of kibbling knives across the discharge end of such holes, with the result that there will be extruded material protruding from the holes to be picked off by the following knife in the group. In this manner, a kibbled product of rather small fragments may be obtained as a product of the mill.

The scraper type blade, bringing up the rear of a group of kibbling knives, will serve to clean off the discharge surface of the die in preparation for the extrusion by the subsequent or following roller.

Where the knife supporting bracket is driven directly from the main shaft of the mill as in the embodiment of Figure 1, two kibbling knives per roller will usually be sufficient in conjunction with a scraper blade to accomplish the purposes of the present invention, though an additional kibbling knife may be employed, if desired, in each group.

Figure 5:
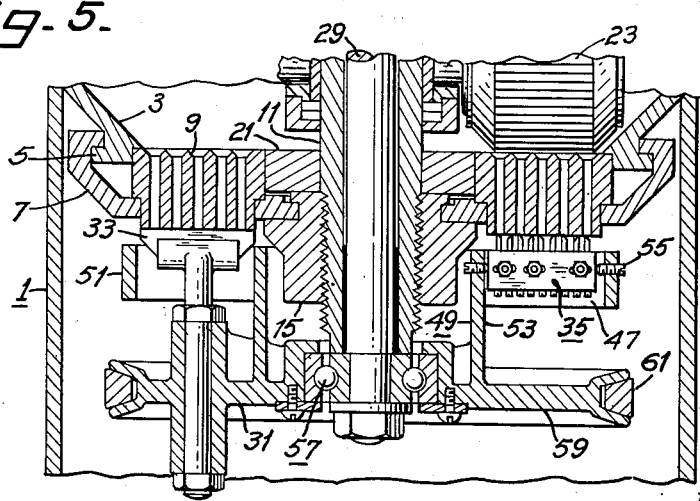
Figure 5 is a fragmentary vertical view, partly in section, of a pellet mill incorporating a modified form of the apparatus of Figure 1.

It is within the contemplation of the present invention, however, to drive the knives independently of the main drive shaft of the mill as illustrated in Figure 5. In such case, the knife bracket and kibbling knife supporting wheel are rotatably supported at the lower end of the knife shaft, as by means of a suitable bearing assembly 57. When so mounted, the hub is formed with an integral pulley 59 permitting a belt drive connection 61 to any suitable independent source of power (not shown).

In this modified form of the invention, the angular velocity of the knives is controlled independently of the angular velocity of the rollers over the die, and consequently, by adjustment of the velocity of the knives with respect to the rollers, the average size of the fragments of the kibbled product of the machine may be altered within wide limits. An increase in the number of kibbling knives in the independently driven type of construction, means a lower range of speed necessary to obtain a comparable product.

While the embodiments of the present invention, discussed above, involve kibbling knives utilizing a plurality of vertically disposed knife blades, such kibbling knives may be replaced by kibbling knives 63 utilizing a plurality of disc-type knife blades 65. A plurality of such knife blades would, in the embodiment depicted in Figure 7, be formed on a sleeve 67 rotatably mounted between the rim of the supporting wheel and the hub, on end bearings 69 carried on a supporting bolt 71 passing axially of the sleeve. The spacing between the individual blades is such as to cause them to bisect the discharge ends of the die holes, as the kibbling knives are moved about the die.

In another form of kibbling knife depicted in Figure 9 and involving disc-type blades, the blades will be mounted for individual rotation about the axial supporting bolt 71 by mounting each such blade on its individual bearing 73 and suitably spacing the blades by spacers 75.

Each of the disc-type blades, while illustrated as possessing a continuous sharpened edge, may be modified to provide a serrated, saw tooth or other edge of suitable configuration.

Regardless of the type of kibbling knife employed, the apparatus functions by causing each blade to apply pressure in a substantially longitudinal plane against the die-molded surface of each extrusion as it emerges from the die. By longitudinal plane, is meant a radial plane through the longitudinal axis of an extrusion. Expressing it in another way, the knife engages the exposed surface of an extrusion on a line substantially parallel to the longitudinal axis of such extrusion.

It will be apparent from the above description of my invention, that the same provides a very simple, convenient and direct means for obtaining a product composed of small units or fragments of a desired size, and that the invention otherwise fulfills all the objects previously recited. While I have disclosed certain forms of my invention, and have described the same in considerable detail, it is apparent that the same is subject to further alteration or modification without departing from the underlying principles involved, and I, accordingly, do not desire to be limited in my protection to the details of such forms as have been illustrated and described, except as may be necessitated by the appended claims.

I claim:

1. Apparatus for producing a kibbled product, comprising means for extruding material for such product through a die to develop extrusions, each having a die-molded surface, said means including a die having a compression side and a discharge side and a plurality of die holes passing therethrough from said compression side to said discharge side, and compression means adapted for relative movement over the compression side of said die; and means for applying a fracturing pressure against the exposed die-molded surface of each such extrusion on a line substantially parallel to the longitudinal axis of such extrusion as it emerges from said die and following a period of emergence, said means including a kibbling knife involving a plurality of blades, means supporting said kibbling knife with said blades adjacent the discharge side of said die, and means for producing relative movement between said kibbling knife and said die with each blade moving in a substantially longitudinal plane through such extrusions.

2. Apparatus for producing a kibbled product, comprising means for extruding material for such product through a die to develop extrusions, each having a die-molded surface, said means including a die having a compression side and a discharge side and a plurality of die holes passing therethrough from said compression side to said discharge side, and compression means adapted for relative movement over the compression side of said die; and means for applying a fracturing pressure against the exposed die-molded surface of each such extrusion on a line substantially parallel to the longitudinal axis of such extrusion, said means including a kibbling knife involving a plurality of blades spaced from one another in accordance with the spacing between holes in said die, means supporting said kibbling knife with said blades adjacent the discharge side of said die and in alignment with rows of said die holes, and means for producing relative movement between said kibbling knife and said die with each blade moving in a substantially longitudinal plane through such extrusions.

3. Apparatus for producing a kibbled product, comprising means for extruding material for such product through a die to develop extrusions, each having a die-molded surface, said means including a die having a compression side and a discharge side and a plurality of die holes passing therethrough from said compression side to said discharge side, and compression means adapted for relative movement over the compression side of said die; and means for applying a fracturing pressure against the exposed die-molded surface of each such extrusion on a line substantially parallel to the longitudinal axis of such extrusion as it emerges from said die and following a period of emergence, said means including a kibbling knife involving a plurality of blades spaced from one another in accordance with the spacing between holes in said die, means supporting said kibbling knife with said blades adjacent the discharge side of said die and in alignment with rows of said die holes, and means for producing relative movement between said kibbling knife and said die with each blade moving in a substantially longitudinal plane through such extrusions.

4. Kibbling apparatus for use in conjunction with a pellet mill having a die and means for extruding pellet forming material through said die; said apparatus comprising a plurality of kibbling knives, each including a plurality of blades spaced in accordance with the holes of such die; and a support for said kibbling knives, said support being in the form of a wheel having a hub, and a rim, and means for mounting said kibbling knives between said hub and said rim.

5. Kibbling apparatus for use in conjunction with a pellet mill having a die and means for extruding pellet-forming material through said die; said apparatus comprising a plurality of kibbling knives, each including a plurality of blades spaced in accordance with the holes of such die; and a support for said kibbling knives, said support being in the form of a wheel having a hub, a rim and spokes connecting said hub and rim at spaced points, and means for mounting said kibbling knives radially of said wheel.

6. Kibbling apparatus for use in conjunction with a pellet mill having a die and means for extruding pellet-forming material through said die; said apparatus comprising a plurality of kibbling knives, each including a plurality of blades spaced in accordance with the holes of such die; and a support for said kibbling knives, said support being in the form of a wheel having a hub, and spokes radiating from said hub at spaced points, and means for mounting said kibbling knives on said spokes.

7. Kibbling apparatus for use in conjunction with a pellet mill having a die and means for extruding pellet-forming material through said die; said apparatus comprising a plurality of kibbling knives, each including a plurality of blades spaced in accordance with the holes of such die; and a support for said kibbling knives, said support being in the form of a wheel having a hub, a rim and spokes connecting said hub and rim at spaced points, and means for adjustably mounting said kibbling knives between said hub and said rim, on said spokes.

8. In a device of the class described, an annular die having extruding orifices extending from the inner face to the outer face, means for extruding material through the die from the inner face to the outer face, means for causing material issuing from the orifices to crumble or break including a gang of discs arranged to rollingly engage the outer face of the die and positioned to only partially block the outlets of the orifices.

References Cited in the file of this patent

UNITED STATES PATENTS

| Number | Name | Date |
| --- | --- | --- |
| 359,480 | Weber | Mar. 15, 1887 |
| 1,435,659 | Roberts | Nov. 14, 1922 |
| 1,879,327 | Kremmling | Sept. 27, 1932 |
| 1,991,546 | Czapar | Feb. 19, 1935 |
| 2,015,681 | Kesty | Oct. 1, 1935 |
| 2,015,857 | Leo | Oct. 1, 1935 |
| 2,044,376 | Webster | June 16, 1936 |
| 2,052,449 | Connell | Aug. 25, 1936 |
| 2,065,141 | Meakin | Dec. 22, 1936 |
| 2,124,744 | Meakin | July 26, 1938 |
| 2,161,480 | MacHaynes | June 6, 1939 |
| 2,174,141 | Sizer | Sept. 26, 1939 |
| 2,186,429 | Reinwald | Jan. 9, 1940 |
| 2,252,900 | Shafer | Aug. 19, 1941 |
| 2,304,759 | Carroll | Dec. 8, 1942 |
| 2,581,614 | Veit | Jan. 8, 1952 |
| 2,603,170 | Meakin | July 15, 1952 |